United States Patent
Sharon et al.

(10) Patent No.: US 11,552,914 B2
(45) Date of Patent: Jan. 10, 2023

(54) FILTERING GROUP MESSAGES

(71) Applicant: International Business Machines Corporation, Armonk, NY (US)

(72) Inventors: Gil Sharon, Haifa (IL); Nili Guy, Haifa (IL)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/594,027

(22) Filed: Oct. 6, 2019

(65) Prior Publication Data

US 2021/0105238 A1 Apr. 8, 2021

(51) Int. Cl.
| | |
|---|---|
| *H04L 51/212* | (2022.01) |
| *G06N 20/00* | (2019.01) |
| *G06N 5/04* | (2006.01) |
| *H04L 51/10* | (2022.01) |
| *G06V 40/16* | (2022.01) |
| *H04L 51/52* | (2022.01) |
| *H04L 67/10* | (2022.01) |

(52) U.S. Cl.
CPC .......... *H04L 51/212* (2022.05); *G06N 5/04* (2013.01); *G06N 20/00* (2019.01); *G06V 40/172* (2022.01); *G06V 40/174* (2022.01); *H04L 51/10* (2013.01); *H04L 51/52* (2022.05); *H04L 67/10* (2013.01)

(58) Field of Classification Search
CPC .......... G06N 20/00; G06N 3/08; G06N 5/04; G06Q 10/107; G06Q 30/0277; G06Q 30/0248; G06K 9/00288; G06K 9/00302; H04L 51/02; H04L 51/22; H04L 51/16; H04L 51/32; H04L 51/12; H04L 51/10; H04L 67/10; H04L 51/212; G06V 40/174; G06V 40/172

See application file for complete search history.

(56) References Cited

U.S. PATENT DOCUMENTS

| | | | | |
|---|---|---|---|---|
| 8,224,905 | B2 * | 7/2012 | Bocharov | G06Q 10/107 709/206 |
| 8,972,307 | B1 * | 3/2015 | Servedio | H04L 51/12 706/12 |
| 10,021,061 | B1 | 7/2018 | Bastide et al. | |
| 2011/0085710 | A1 * | 4/2011 | Perlmutter | G06K 9/6263 382/118 |
| 2014/0328570 | A1 | 11/2014 | Cheng et al. | |
| 2015/0189233 | A1 * | 7/2015 | Carpenter | H04N 7/15 348/E7.083 |

(Continued)

FOREIGN PATENT DOCUMENTS

| | | |
|---|---|---|
| CN | 103064858 B | 4/2013 |
| CN | 105099877 B | 11/2015 |

(Continued)

OTHER PUBLICATIONS

"International Search Repod Issued in PCT Patent Application No. PCT/IB2020/058595", dated Dec. 30, 2020, 6 Pages.

*Primary Examiner* — Jonathan A Bui
*Assistant Examiner* — Zonghua Du
(74) *Attorney, Agent, or Firm* — Barry D. Blount

(57) ABSTRACT

An example system includes a processor to receive an artificial intelligence (AI) model trained on a client device associated with a particular user. The processor is to filter a group message based on the AI model. The processor is to send the filtered group message to the client device.

18 Claims, 7 Drawing Sheets

(56) References Cited

U.S. PATENT DOCUMENTS

| | | | |
|---|---|---|---|
| 2017/0222960 A1* | 8/2017 | Agarwal | G06Q 10/107 |
| 2017/0353423 A1* | 12/2017 | Morrison | G06F 3/04842 |
| 2017/0359362 A1* | 12/2017 | Kashi | H04L 63/1425 |
| 2018/0026926 A1* | 1/2018 | Nigam | H04L 51/08 |
| | | | 709/206 |
| 2018/0053114 A1 | 2/2018 | Adjaoute | |
| 2018/0123993 A1 | 5/2018 | Song et al. | |
| 2018/0131653 A1 | 5/2018 | Beausoleil | |
| 2018/0219817 A1* | 8/2018 | Zang | H04L 67/322 |
| 2019/0114370 A1* | 4/2019 | Cerino | G06F 40/216 |
| 2019/0124025 A1* | 4/2019 | Choudhary | H04L 51/12 |
| 2019/0215482 A1 | 7/2019 | Sathya et al. | |
| 2020/0150832 A1* | 5/2020 | Winn | G06F 16/54 |
| 2020/0302656 A1* | 9/2020 | Kumar | G06F 3/04845 |
| 2020/0311120 A1* | 10/2020 | Zhao | G06K 9/00677 |
| 2020/0380243 A1* | 12/2020 | Singh | G06K 9/00295 |
| 2021/0406595 A1* | 12/2021 | Cui | G06K 9/6218 |

FOREIGN PATENT DOCUMENTS

| | | | |
|---|---|---|---|
| CN | 107124349 A | 9/2017 | |
| CN | 108537160 A | 9/2018 | |
| CN | 110166826 A | 8/2019 | |

\* cited by examiner

200

FILTERING GROUP MESSAGES

BACKGROUND

The present techniques relate to group messaging. More specifically, the techniques relate to filtering media in group messages.

SUMMARY

According to an embodiment described herein, a system can include processor to receive an artificial intelligence (AI) model trained on a client device associated with a particular user. The processor can also further filter a group message based on the AI model. The processor can also send the filtered group message to the client device.

According to another embodiment described herein, a method can include receiving, via a processor, media from a storage of a client device. The method can further include generating, via the processor, an artificial intelligence (AI) model based on the media. The method can also further include filtering, via the processor, a group message to be stored on the client device via the AI model filter.

According to another embodiment described herein, a computer program product for filtering group messages can include computer-readable storage medium having program code embodied therewith. The computer readable storage medium is not a transitory signal per se. The program code executable by a processor to cause the processor to receive media from a storage of a client device. The program code can also cause the processor to generate an artificial intelligence (AI) model based on the media. The program code can also cause the processor to filter a group message to be stored on the client device via the AI model filter.

DETAILED DESCRIPTION

Group messaging allows a number of people in a group to share textual messages and multimedia messages that are broadcasted to all members of a group simultaneously. For example, multimedia messages may include audiovisual media such as pictures, video, or audio. However, some users may be members of many groups. Thus, it may be difficult for such users to keep track of all their messages in all their groups, and also keep local copies of all messages being sent from all the groups that they are members of. Furthermore, higher quality multimedia may use more memory and thus take more space on mobile devices. Thus, such group multimedia messages may quickly fill the memory of a user's mobile device. Moreover, the use of cloud storage may be avoided for various reasons.

In addition, users may not be interested in all the multimedia received in all of the groups that they are subscribed to. For example, although parents may be interested in pictures including their daughters or sons, they may not be as interested in pictures of other people. As one example, in a school or kindergarten group when there is a trip, there may be bursts of many images and messages during the day. A user does not want to receive those messages that do not interest him and look at the phone so many times. Thus, users may spend lots of time manually removing pictures from mobile devices in order to increase storage space.

According to embodiments of the present disclosure, a system can filter group messages based on an artificial intelligence (AI) model. The model may be trained on the client device of a user. An example system includes a processor to receive an artificial intelligence (AI) model trained on a client device associated with a particular user. The processor can filter group messages based on the AI model. The processor send the filtered group messages to the client device. In some examples, the group messages may be filtered on the client device. Thus, embodiments of the present disclosure allow group messages to be filtered and storage to be saved on the client device by preventing messages that are filtered out from being stored on the client device. In addition, the techniques enable more efficient use of the client device. For example, the user may not need to manually review and delete unwanted messages from the client device. Moreover, the data of a user may be protected by generating the AI model on the client device rather than on a publicly available server.

Figure 1:
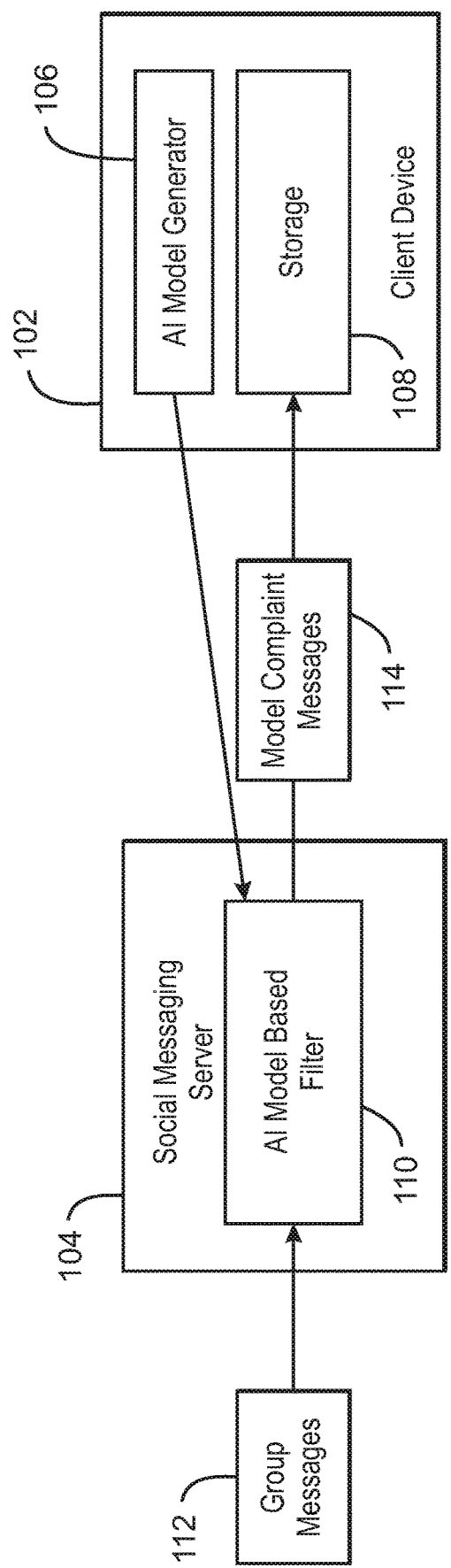
FIG. 1 is a block diagram of an example system for filtering group messages at a social messaging server.

With reference now to FIG. 1, a block diagram shows an example system for filtering group messages at a social messaging server. The example system is generally referred to by the reference number 100. FIG. 1 includes a client device 102 communicatively coupled to a social messaging server 104. For example, the client device 102 may be an edge device that is communicatively coupled to a cloud based service. The client device 102 may be associated with a particular user. The client device 102 includes an AI model generator 106 and a storage 108. The social messaging server 104 includes an AI model based filter 110.

In the example of FIG. 1, a number of group messages 112 are received at the social messaging server 104. For example, the group messages 112 may be received from one or more other client devices (not shown). In various examples, every group message 112 received in the social app server 104 is passed through an AI model based filter 110. The AI model based filter 110 can analyze the group messages 112 based on a training data set. In various examples, the training data set can be based on visual face recognition or text filtering. For example, the AI model generator 106 of the client device 104 may receive training set images from the storage 108 of the client device 102 and generate an AI model based on the training set images. As one example, detected faces in the training set images on the storage 108 may be used to generate the AI model.

Still referring to FIG. 1, in some examples, the AI model based filter 110 may be implemented using a set of uploaded media from the client device 102. For example, a user may upload portraits of people that the user is interested in seeing additional pictures of. In some examples, an app on the client device can suggest the user different portrait faces for filtering, based on the most common faces in his mobile device gallery, which then the user may then choose from. In various examples, an app can automatically choose the faces which the filter will be based on, according to the most common photos in the picture gallery of the storage 108. In some examples, the user can upload text expressions when he is interested to see only text messages that contains these expressions. For example, the text expressions may be search expressions or regular expressions.

In various examples, regardless of the filtering method, after choosing the training data filter, a training set containing all the images that contain the faces chosen from the user's gallery, may be sent to the social messaging server 104. For example, the training set may be used for training a new AI model which the filtering will be based on. In the case of text filtering, the chosen text phrases may be sent to the messaging server and no training may be performed.

In various examples, the AI model generator 106 on the client device 102 can learn a user's priorities and detect specific relevant content by analyzing the user's behavior on the client device 102. For example, the AI model generator 106 can monitor a photo gallery, learn deletion patterns of messages, among other habits. For example, the input for the AI model generator 106 can be a digital camera roll of a user, the messages the user deletes manually, the images the user chooses to save, a contact list, a regular expression, a search report, etc. The model can be updated continuously, and a new updated model used in the social messaging server 104 to filter messages. The generated AI model may then be sent to the social messaging server 104 for filtering group messages 112.

In various examples, the group messages 112 are analyzed using the AI model. In some examples, the output of the AI model based filter 110 may be binary. For example, either a video or photo is compatible with the rules of an AI model or not. Thus, the photo or other group message may continue and be sent to the client side, or not, accordingly. As one example, the photo of a group message 112 may include a face that is included in the AI model received from the AI model generator 106. Thus, the group message 112 may be sent as part of the model compliant message 114 to the client device 102. In this way, the techniques prevent a huge amount of uninteresting data to be saved on the local storage 108 of the client device 102. Only the compatible, relevant content that the user wants is allowed to actually arrive and be saved on the client device 102. The user may then be able to watch the relevant content stored on the storage 108. Moreover, uninteresting data may be prevented from being saved on the local storage 108 of the client device 102. Thus, significant amounts of storage 108 may be saved for storing additional content that the user is more interested in viewing.

In various examples, a set of user preferences may be set to control display of the filtered group messages. For example, the messages that are filtered out may be set to not be presented, received, or stored. In some examples, the messages that are filtered out as less relevant may be set to be viewed once and then immediately deleted without being stored in storage.

It is to be understood that the block diagram of FIG. 1 is not intended to indicate that the system 100 is to include all of the components shown in FIG. 1. Rather, the system 100 can include fewer or additional components not illustrated in FIG. 1 (e.g., additional client devices, or additional social messaging servers, group messages, filters, etc.).

Figure 2:
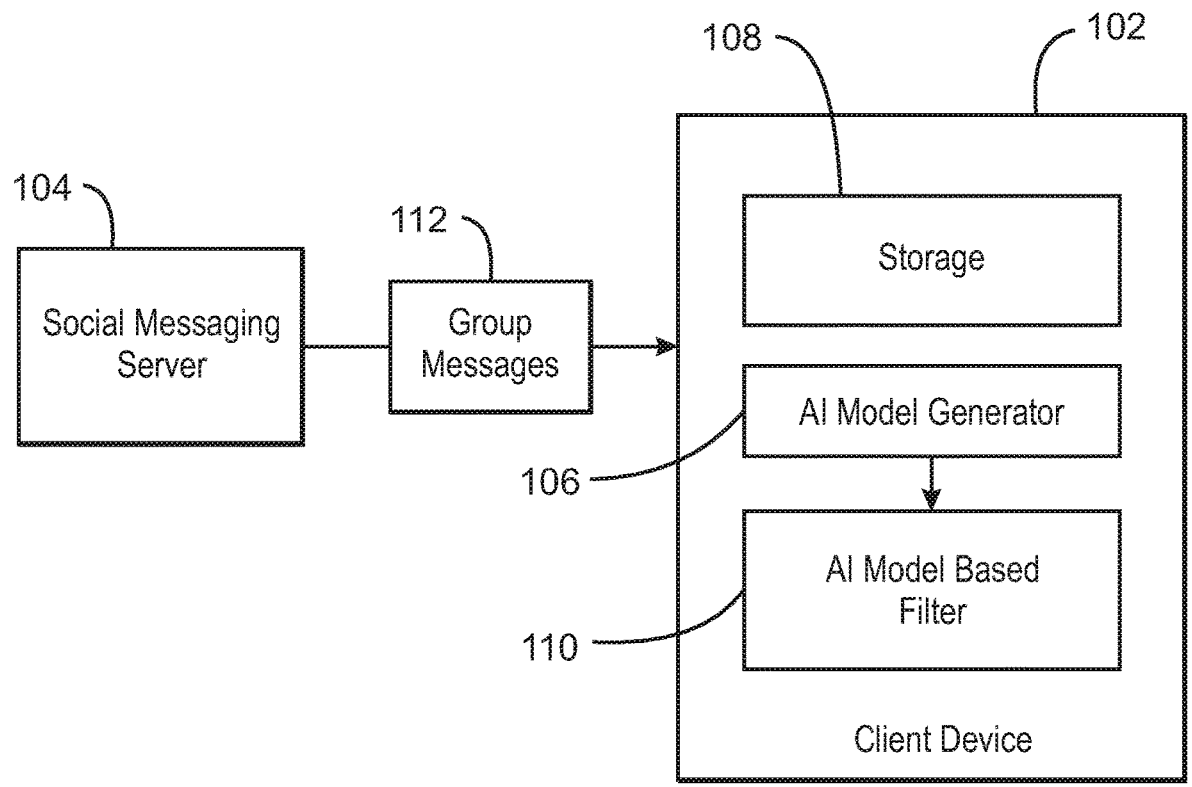
FIG. 2 is a block diagram of another example system for filtering group messages at a client device.

With reference now to FIG. 2, a block diagram shows an example system for filtering group messages at a client device. The example system is generally referred to by the reference number 200. FIG. 2 includes similarly numbered elements described in FIG. 1. However, in FIG. 2, the AI model based filter 110 is located at the client device 102.

In the example of FIG. 2, the client device 102 receives group messages 112 from the social messaging server 104. The AI model based filter 110 may be similarly trained to filter the group messages based on detected preferences of the user, as described in FIG. 1. In the example of FIG. 2, any number of group messages 112 may be deleted in response to detecting that the group messages 112 are not compatible with the rules of an AI model. Similarly, group messages 112 may be saved to storage 108 in response to detecting that the group messages 112 are compatible with the rules of the AI model. In various examples, the user may never see the group messages 112 that are incompatible as they may be filtered and deleted before being shown to the user.

It is to be understood that the block diagram of FIG. 2 is not intended to indicate that the system 200 is to include all of the components shown in FIG. 2. Rather, the system 200 can include fewer or additional components not illustrated in FIG. 2 (e.g., additional client devices, or additional social messaging servers, group messages, filters, etc.).

Figure 3:
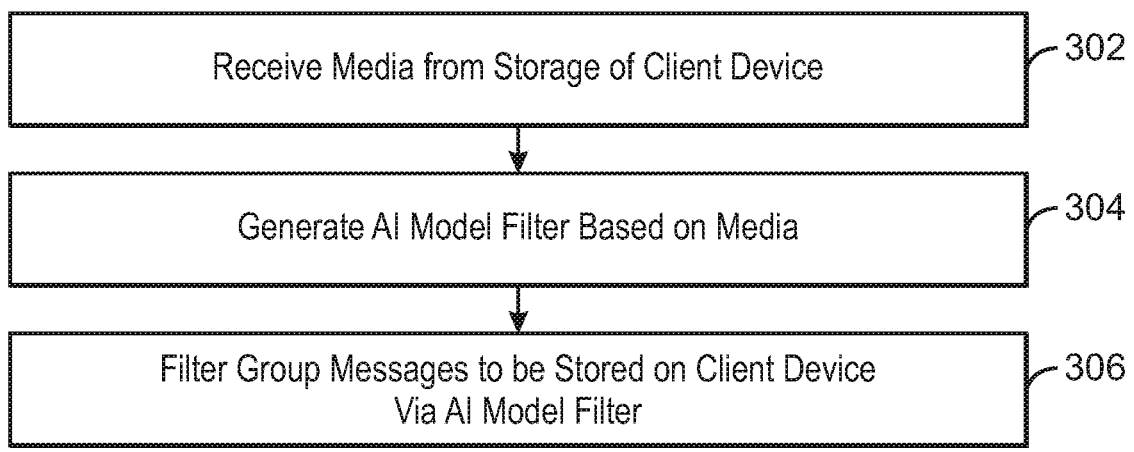
FIG. 3 is a block diagram of an example method that can filter group messages.

FIG. 3 is a process flow diagram of an example method that can filter group messages. The method 300 can be implemented with any suitable computing device, such as the computing device 400 of FIG. 4 and is described with reference to the systems 100 and 200 of FIGS. 1 and 2. In some examples, the method 300 can be implemented by the computer-readable medium 700 of FIG. 7.

At block 302, media are received from a storage of a client device. For example, the media may include videos or images. In some examples, text expressions may also be received from a user.

At block 304, an artificial intelligence (AI) model is generated based on the media. For example, the AI model may be generated on a client device associated with a particular user. In some examples, the AI model is generated by training the AI model using face recognition on the media. In various examples, the AI model is generated by training the AI model on user-provided media. In some examples, the AI model is generated by training the AI model using media associated with a particular group.

At block 306, group messages to be stored on the client device are filtered via the AI model filter. In various examples, group messages from the particular group are filtered using an AI model generated for the particular group.

The process flow diagram of FIG. 3 is not intended to indicate that the operations of the method 300 are to be executed in any particular order, or that all of the operations of the method 300 are to be included in every case. Additionally, the method 300 can include any suitable number of additional operations. For example, the method 300 may include presenting media to a user via the client device and receiving a selection of relevant media from the user. The method 300 can also include presenting filtered group messages via the client device.

In some scenarios, the techniques described herein may be implemented in a cloud computing environment. As discussed in more detail below in reference to at least FIGS. 4-7, a computing device configured to filter media in group messages may be implemented in a cloud computing environment. It is understood in advance that although this disclosure may include a description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
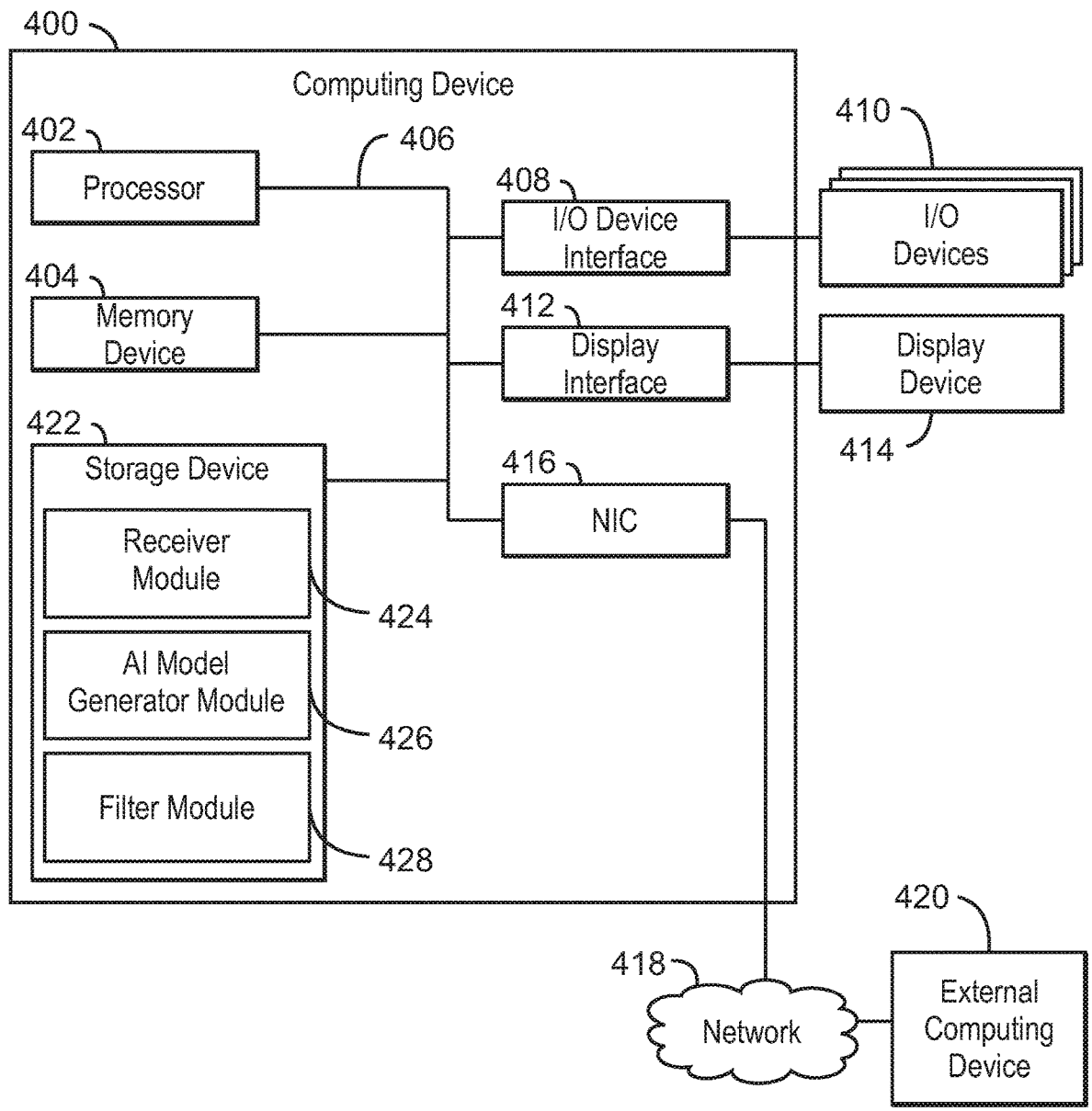
FIG. 4 is a block diagram of an example computing device that can filter group messages.

FIG. 4 is block diagram of an example computing device that can filter group messages. The computing device 400 may be for example, a server, desktop computer, or laptop computer. In various examples, the computing device 400 may be an edge device, such as a tablet computer, or a smartphone. In some examples, computing device 400 may be a cloud computing node. Computing device 400 may be described in the general context of computer system executable instructions, such as program modules, being executed by a computer system. Generally, program modules may include routines, programs, objects, components, logic, data structures, and so on that perform particular tasks or implement particular abstract data types. Computing device 400 may be practiced in distributed cloud computing environments where tasks are performed by remote processing devices that are linked through a communications network. In a distributed cloud computing environment, program modules may be located in both local and remote computer system storage media including memory storage devices.

The computing device 400 may include a processor 402 that is to execute stored instructions, a memory device 404 to provide temporary memory space for operations of said instructions during operation. The processor can be a single-core processor, multi-core processor, computing cluster, or any number of other configurations. The memory 404 can include random access memory (RAM), read only memory, flash memory, or any other suitable memory systems.

The processor 402 may be connected through a system interconnect 406 (e.g., PCI®, PCI-Express®, etc.) to an input/output (I/O) device interface 408 adapted to connect the computing device 400 to one or more I/O devices 410. The I/O devices 410 may include, for example, a keyboard and a pointing device, wherein the pointing device may include a touchpad or a touchscreen, among others. The I/O devices 410 may be built-in components of the computing device 400, or may be devices that are externally connected to the computing device 400.

The processor 402 may also be linked through the system interconnect 406 to a display interface 412 adapted to connect the computing device 400 to a display device 414.

The display device 414 may include a display screen that is a built-in component of the computing device 400. The display device 414 may also include a computer monitor, television, or projector, among others, that is externally connected to the computing device 400. In addition, a network interface controller (NIC) 416 may be adapted to connect the computing device 400 through the system interconnect 406 to the network 418. In some embodiments, the NIC 416 can transmit data using any suitable interface or protocol, such as the internet small computer system interface, among others. The network 418 may be a cellular network, a radio network, a wide area network (WAN), a local area network (LAN), or the Internet, among others. An external computing device 420 may connect to the computing device 400 through the network 418. In some examples, external computing device 420 may be an external webserver 420. In some examples, external computing device 420 may be a cloud computing node.

The processor 402 may also be linked through the system interconnect 406 to a storage device 422 that can include a hard drive, an optical drive, a USB flash drive, an array of drives, or any combinations thereof. In some examples, the storage device may include a receiver module 424, an artificial intelligence (AI) model generator module 426, and a filter module 428. The receiver module 424 can receive an artificial intelligence (AI) model trained on a client device associated with a particular user. The AI model generator module 426 can generate an AI model based on media stored on a client device. For example, the AI model generator module 426 can train the AI model using face recognition on the media. In some examples, the AI model generator module 426 can train the AI model on user-provided media. In various examples, the AI model generator module 426 can train the AI model on user-provided expressions. For example, the user-provided expressions may be search expressions or regular expressions. The filter module 428 can filter a group message based on the AI model. The filter module 428 can save the filtered messages on a storage of a client device. In some examples, the filter module 428 can send the filtered messages to the client device to present and store the filtered messages.

It is to be understood that the block diagram of FIG. 4 is not intended to indicate that the computing device 400 is to include all of the components shown in FIG. 4. Rather, the computing device 400 can include fewer or additional components not illustrated in FIG. 4 (e.g., additional memory components, embedded controllers, modules, additional network interfaces, etc.). For example, the AI model generator module 426 may be excluded if the computing device 400 is a cloud node. In some examples, the filter module 428 may be excluded if the computing device 400 is an edge device. For example, filtered message may instead be received from an external computing device 420, such as a cloud computing node, containing the filter module 428. Furthermore, any of the functionalities of the receiver module 424, the AI model generator module 426, and the filter module 428 may be partially, or entirely, implemented in hardware and/or in the processor 402. For example, the functionality may be implemented with an application specific integrated circuit, logic implemented in an embedded controller, or in logic implemented in the processor 402, among others. In some embodiments, the functionalities of the receiver module 424, AI model generator module 426, and filter module 428 can be implemented with logic, wherein the logic, as referred to herein, can include any suitable hardware (e.g., a processor, among others), software (e.g., an application, among others), firmware, or any suitable combination of hardware, software, and firmware.

Figure 5:
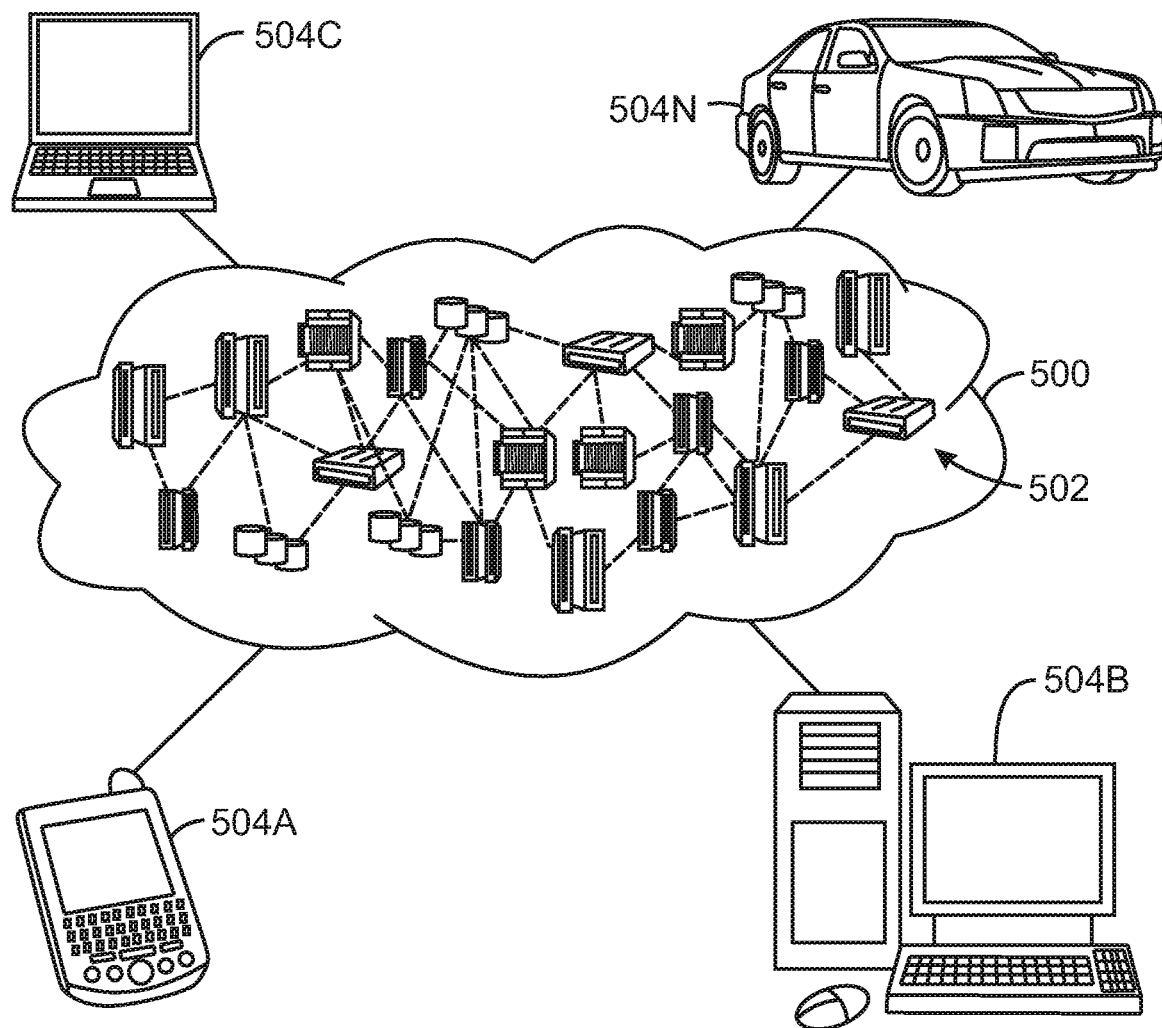
FIG. 5 is a process flow diagram of an example cloud computing environment according to embodiments described herein.

Referring now to FIG. 5, illustrative cloud computing environment 500 is depicted. As shown, cloud computing environment 500 comprises one or more cloud computing nodes 502 with which local computing devices used by cloud consumers, such as, for example, personal digital assistant (PDA) or cellular telephone 504A, desktop computer 504B, laptop computer 504C, and/or automobile computer system 504N may communicate. Nodes 502 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 504A-N shown in FIG. 5 are intended to be illustrative only and that computing nodes 502 and cloud computing environment 500 can communicate with any type of computerized device over any type of network and/or network addressable connection (e.g., using a web browser).

Figure 6:
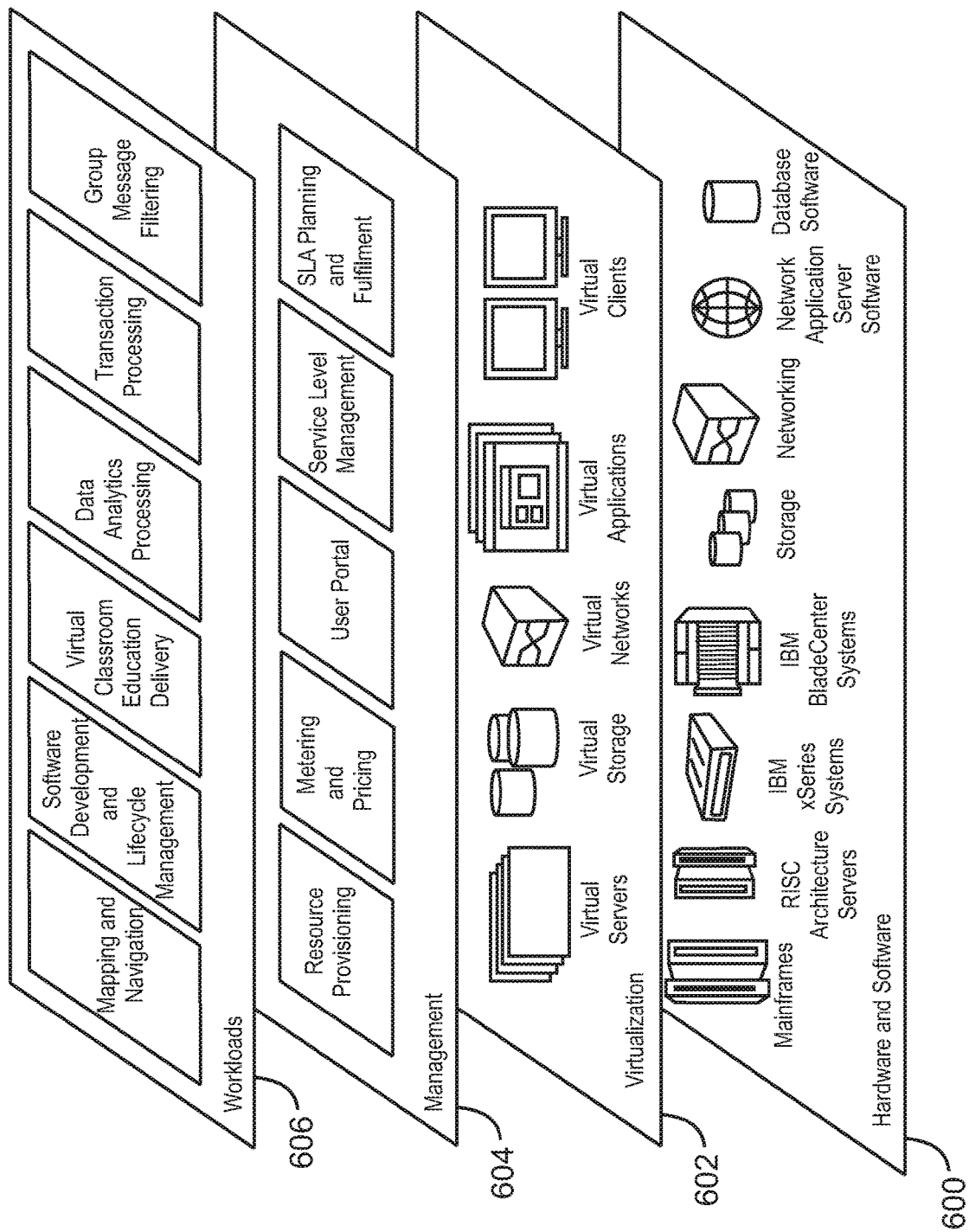
FIG. 6 is a process flow diagram of an example abstraction model layers according to embodiments described herein.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided.

Hardware and software layer 600 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 602 provides an abstraction layer from which the following examples of virtual entities may be provided: virtual servers; virtual storage; virtual networks, including virtual private networks; virtual applications and operating systems; and virtual clients. In one example, management layer 604 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide prearrangement for, and procurement of, cloud computing resources for which a future requirement is anticipated in accordance with an SLA.

Workloads layer 606 provides examples of functionality for which the cloud computing environment may be utilized. Examples of workloads and functions which may be provided from this layer include: mapping and navigation; software development and lifecycle management; virtual classroom education delivery; data analytics processing; transaction processing; and group message filtering.

The present techniques may be a system, a method or computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present techniques may be assembler instructions, instruction-set-architecture (ISA) instructions, machine instructions, machine dependent instructions, microcode, firmware instructions, state-setting data, or either code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present techniques.

Aspects of the present techniques are described herein with reference to flowchart illustrations and/or block diagrams of methods, apparatus (systems), and computer program products according to embodiments of the techniques. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 7:
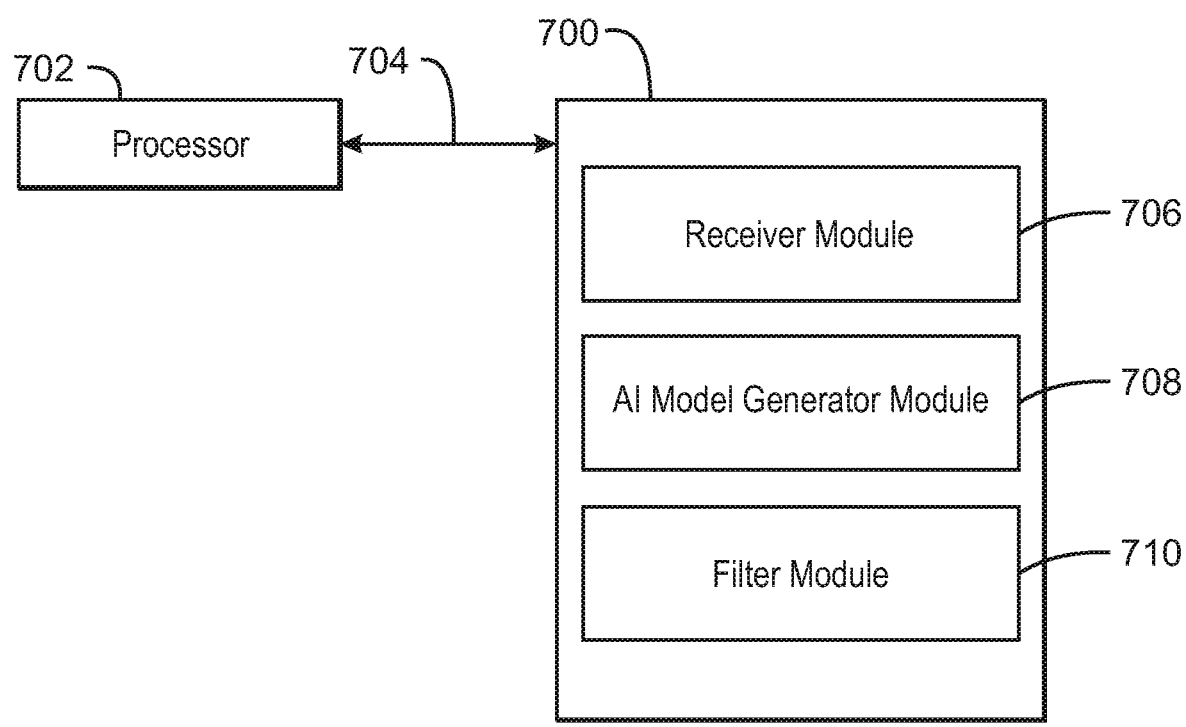
FIG. 7 is an example tangible, non-transitory computer-readable medium that can filter group messages.

Referring now to FIG. 7, a block diagram is depicted of an example tangible, non-transitory computer-readable medium 700 that can filter group messages. The tangible, non-transitory, computer-readable medium 700 may be accessed by a processor 702 over a computer interconnect 704. Furthermore, the tangible, non-transitory, computer-readable medium 700 may include code to direct the processor 702 to perform the operations of the method 300 of FIG. 3.

The various software components discussed herein may be stored on the tangible, non-transitory, computer-readable medium 700, as indicated in FIG. 7. For example, a receiver 706 includes code to receive media from a storage of a client device. The receiver module 706 also includes code to receive user-provided expressions. In some examples, the receiver module 706 includes code to monitor message deletion patterns. In some examples, the module 706 includes code to. An artificial intelligence (AI) model generator module 708 includes code to generate an artificial intelligence (AI) model based on the media. The AI model generator module 708 further includes code to train the AI model using face recognition on the media. The AI model generator module 708 also includes code to train the AI model on user-provided media. In some examples, the AI model generator module 708 also includes code to train the AI model using media associated with a particular group. In some examples, the AI model generator module 708 also includes code to present media to a user via the client device and receive a selection of relevant media from the user. A filter module 710 includes code to filter a group message to be stored on the client device via the AI model filter. The filter module 710 also includes code to present filtered group messages via the client device. It is to be understood that any number of additional software components not shown in FIG. 7 may be included within the tangible, non-transitory, computer-readable medium 700, depending on the particular application.

The flowchart and block diagrams in the Figures illustrate the architecture, functionality, and operation of possible implementations of systems, methods, and computer program products according to various embodiments of the present techniques. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. It is to be understood that any number of additional software components not shown in FIG. 7 may be included within the tangible, non-transitory, computer-readable medium 700, depending on the specific application.

The descriptions of the various embodiments of the present techniques have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising a processor to:
   receive, at a social messaging server, a training set of images from a client device, wherein images in the training set of images are selected using face recognition from a digital camera roll on the client device based on a set of faces chosen by a user of the client device;
   train, at the social messaging server, an artificial intelligence (AI) model, wherein the AI model is trained on the training set of images, wherein all of images in the training set of images comprise a detected face from the set of chosen faces;
   filter a group message received from a second client device and to be sent to a plurality of client devices based on the AI model to remove a second image or a second video from the group message and generate a filtered group message;
   send the filtered group message to the client device;
   train, at the social messaging server, in response to the user deleting the filtered group message, an updated AI model trained on the deleted group message;
   filter, via the updated AI model, a second group message from the second client device or a third client device; and
   send the second filtered group message to the client device.

2. The system of claim 1, wherein the filtered group message is saved on a storage of the client device.

3. The system of claim 1, wherein the AI model is trained on user-provided images or videos.

4. The system of claim 1, wherein the AI model is trained on user-provided expressions.

5. The system of claim 1, wherein the client device comprises an edge device communicatively coupled to a cloud service executed by the processor.

6. The system of claim 1, wherein the images are stored in the digital camera roll on the client device and the AI model is continuously updated based on user behavior associated with filtered group messages.

7. The system of claim 1, wherein the set of faces is selected by the user from a set of most common faces in the digital camera roll provided by an application on the client device.

8. A computer-implemented method, comprising:
   receiving, via a processor at a social messaging server, a training set of images from a storage of a client device, wherein images in the training set of images are selected using face recognition from a digital camera roll on the client device based on a set of faces chosen by a user of the client device;
   training, via the processor, an artificial intelligence (AI) model based on the training set of images, wherein all of images in the training set of images comprise a detected face from the set of chosen faces;
   filtering, via the processor, a group message received from a second client device to be stored on the client device via a filter based on the AI model to remove multimedia from the group message and generating a filtered group message;
   training, via the processor at the social messaging server, in response to the user deleting the filtered group message, an updated AI model trained on the deleted group message;
   filtering, via the updated AI model, a second group message from the second client device or a third client device; and
   sending the second filtered group message to the client device.

9. The computer-implemented method of claim 8, comprising generating the AI model on the client device associated with the user.

10. The computer-implemented method of claim 8, wherein generating the AI model comprises training the AI model on a user-provided image or video.

11. The computer-implemented method of claim 8, wherein generating the AI model comprises training the AI model using an image or a video associated with a particular group, wherein group messages from the particular group are filtered using the AI model.

12. The computer-implemented method of claim 8, comprising presenting images or videos comprising the set of faces to the user via the client device and receiving a selection of relevant images or videos from the user.

13. The computer-implemented method of claim 8, comprising presenting filtered group messages via the client device.

14. A computer program product for filtering group messages, the computer program product comprising a computer-readable storage medium having program code embodied therewith, wherein the computer-readable storage medium is not a transitory signal per se, the program code executable by a processor to cause the processor to:
    receive, at a social messaging server, a training set of images from a client device, wherein images in the training set of images are selected using face recognition from a digital camera roll on the client device based on a set of faces chosen by a user of the client device;
    generate, at the social messaging server, an artificial intelligence (AI) model based on the training set of images, wherein all of images in the training set of images comprise a detected face from the set of chosen faces;
    filter a group message received from a second client device to be stored on the client device via a filter based on the AI model to remove a second image or a second video from the group message and generate a filtered group message;
    train, at the social messaging server, in response to the user deleting the filtered group message, an updated AI model trained on the deleted group message;
    filter, via the updated AI model, a second group message from the second client device or a third client device; and
    send the second filtered group message to the client device.

15. The computer program product of claim 14, further comprising program code executable by the processor to train the AI model on a user-provided image or video.

16. The computer program product of claim 14, further comprising program code executable by the processor to train the AI model using an image or a video associated with a particular group, wherein group messages from the particular group are to be filtered using the AI model.

17. The computer program product of claim 14, further comprising program code executable by the processor to present images or videos comprising the set of faces to the user via the client device and receive a selection of relevant images or videos from the user.

18. The computer program product of claim 14, further comprising program code executable by the processor to present filtered group messages via the client device.

* * * * *